(12) United States Patent
Prateek

(10) Patent No.: US 8,059,630 B2
(45) Date of Patent: Nov. 15, 2011

(54) SYSTEM AND METHOD FOR SUB-FRAME ID AND FRAME BOUNDARY DETECTION IN LONG TERM EVOLUTION

(75) Inventor: Basu Mallick Prateek, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1118 days.

(21) Appl. No.: 11/844,215

(22) Filed: Aug. 23, 2007

(65) Prior Publication Data
US 2008/0049715 A1  Feb. 28, 2008

(30) Foreign Application Priority Data
Aug. 24, 2006  (IN) .......................... 1518/CHE/2006

(51) Int. Cl.
*H04J 3/06* (2006.01)
(52) U.S. Cl. ........ 370/350; 370/310; 370/329; 370/330; 370/345; 375/130; 375/145; 375/149; 375/354; 375/363; 375/365; 375/366; 375/368
(58) Field of Classification Search .................. 370/310, 370/329, 330, 345, 350, 354; 375/130, 145, 375/149, 363, 365, 366, 368, 354
See application file for complete search history.

(56) References Cited

U.S. PATENT DOCUMENTS

| 6,574,267 | B1 | 6/2003 | Kanterakis et al. | |
|---|---|---|---|---|
| 7,006,976 | B2 | 2/2006 | Glatt | |
| 7,292,548 | B2 * | 11/2007 | Lim et al. | 370/328 |
| 2001/0030991 | A1 * | 10/2001 | Imai et al. | 375/145 |
| 2003/0152178 | A1 * | 8/2003 | Tanno et al. | 375/354 |
| 2003/0169702 | A1 | 9/2003 | Ryu et al. | |
| 2004/0085938 | A1 * | 5/2004 | Tiedemann et al. | 370/335 |
| 2009/0080385 | A1 * | 3/2009 | Kim et al. | 370/336 |

FOREIGN PATENT DOCUMENTS
RU  2 251 216  4/2005

* cited by examiner

*Primary Examiner* — Hassan Phillips
*Assistant Examiner* — Gautam Sharma
(74) *Attorney, Agent, or Firm* — The Farrell Law Firm, P.C.

(57) ABSTRACT

The present invention provides a unique manner of identifying the Frame boundaries in multiple identical/non-identical Synchronization Channels (SCHs) in different sub-frames via a new sub frame position difference method. The method implements the differences between the different sub-frames carried by the SCH. The sub frame identity, and hence the frame boundary, can be identified by calculating the difference between the positions, based on time or number of slots/sub-frames or any data packets, of the two subsequent slots/sub-frames or any identical data packets.

19 Claims, 2 Drawing Sheets

SYSTEM AND METHOD FOR SUB-FRAME ID AND FRAME BOUNDARY DETECTION IN LONG TERM EVOLUTION

PRIORITY

This application claims priority under 35 U.S.C. §119 to an application filed in the Indian Patent Office on Aug. 24, 2006 and assigned serial no. 1518/CHE/2006, the contents of which are incorporated herein by reference.

BACKGROUND OF THE INVENTION

1. Field of the Invention

The present invention relates generally to the field of Communication Protocol in Long Term Evolution (hereinafter LTE) systems—Layer1 (Physical Layer), and more particularly, to a system and method for sub-frame IDentification (hereinafter ID) and Frame boundary detection in LTE.

2. Description of the Related Art

In the current specification document for Third Generation Partnership Project (3GPP) TR 25.814 v 7.0.0 (2006-06), three different options for radio frame timing detection are given as Synchronization CHannel (hereinafter SCH)-based detection, Broadcast Channel (hereinafter BCH)-based detection and reference signal-based detection.

The SCH-based detection is applicable to both hierarchical and non-hierarchical SCH. With SCH based detection, the radio frame timing can be estimated by detecting the cell-specific SCH sequence in the frequency domain employing the SCH symbol timing detected in a previous step. When primary and secondary SCH are used in the hierarchical SCH, coherent detection of the cell-specific secondary SCH can be performed using the primary SCH as a reference signal.

The BCH-based detection is also applicable to both the hierarchical and non-hierarchical SCH. For BCH-based frame-timing detection, the frame-timing is detected by decoding the BCH. This may include hypothesis testing if the BCH is transmitted less frequently than the SCH. This method requires BCH reception both for the initial cell search and neighboring cell search.

The reference signal-based detection is primarily considered for the hierarchical SCH. The frame timing information is detected by the reference signal waveform (i.e., modulation pattern). In this case, the repetition interval of the reference signal waveform should be equal to the radio frame period, or 10 milliseconds.

SCH based detection requires the detection of the cell-specific SCH sequence in the frequency domain employing the SCH symbol timing detected in the previous step. As many as 512 or more cell-specific SCH sequences need to exist, and also the UE will need to detect them by using processes such as correlation, which are time consuming. Moreover, the UE needs to store these cell-specific sequences.

BCH based detection requires the BCH reception for an initial cell search, which is not desirable. However, at this time the hypothesis testing if the BCH is transmitted less frequently than the SCH has yet to be completed.

Reference signal based detection has additional dependency on the reference signal waveform (i.e., modulation pattern) detection. Only upon reading of the reference signal contents may there be reliance on the timing in this method. Also, the reference signal waveform is only scheduled to be transmitted once per 10 milliseconds. Therefore, it imposes an additional delay in the frame boundary detection. The cell search procedure should be independent of any such signal waveform detection.

Commonly assigned US Patent Publication Serial No. US20030169702A1 to Ryu et al. describes a method of cell searching in a Wideband-Code Division Multiple Access (W-CMDA) mobile communication. According to the patent publication, an "index counter" is used to continuously calculate the timing offset or offset between frame boundaries. The index counter includes a "slot counter" and a "lower counter" which are used respectively for counting the slots and the chips corresponding to a length of a number of slots. Further, the Ryu et al. publication specifies that once the position of each asynchronous cell is determined by the slot counter, it is possible to calculate the offset between them wherein, the offset is defined as the difference between asynchronous frame boundaries. Moreover, the Ryu et al. publication describes that, using a similar process the lower counter may be able to calculate the offset between the slots corresponding to each frame. It is further mentioned in the Ryu et al. publication that such an algorithm is more time efficient for cell search.

U.S. Pat. No. 6,574,267 B1 to Kanterakis et al. describes an improvement to CDMA systems employing spread-spectrum modulation between a Base Station (BS) and a Remote Station (RS). The process starts with one RS receiving broadcast common—synchronization channel data, and after determining frame timing from the frame-timing signal, the signal is transmitted from a first RS-spread-spectrum transmitter as an access—burst signal. In the Kanterakis et al. patent, the BS notifies the RS about the correct receiving of the data packets. As an example, it has been specified in the patent publication that the packet could be identified as consisting of a number of frames, and sub-frames to the frames. The frames and sub-frames are identified by specific numbers. Further, the Kanterakis et al. patent describes that the correctness of the receiving of data packets could be achieved by identifying the frames and sub-frames carrying the data packets or by identifying the frames and sub-frames that have been received as error.

SUMMARY OF THE INVENTION

The present invention has been made to solve the aforementioned problems occurring in the prior art, and discloses a system and method wherein the need to use the SCH, BCH or the reference signals is obviated.

The method herein discloses a unique and easy way to identify the Frame boundary when there are multiple identical non identical SCHs in different sub-frames using a new method that will be referred to as "sub frame position difference method". This method identifies the sub-frame ID based on the symbol/sub-frame difference between two sub-frames carrying the SCH symbol.

The present invention discloses a method that identifies the position of a slot/sub-frame or any data packet based on the differences between them. The present invention further discloses a system and method which can identify the slot/sub-frame or any data packet ID based on the difference, in time or number of slots/sub-frames or any data packets, between two subsequent slots/sub-frames or any data packets which may be identical to each other.

The present invention provides a unique manner of identifying the Frame boundaries in multiple identical non-identical SCHs in different sub-frames via the use of the sub frame position difference method, which implements the use of the differences between the different sub frames carried by the SCH. The sub frame identity, and hence the frame boundary, can be identified by calculating the difference between the positions (e.g., based on time or number of slots/sub-frames or any data packets) of the two subsequent slots/sub-frames or any data packets which may be identical to each other.

The present invention discloses a method for sub-frame ID and frame boundary detection in LTE, which method implements the use of the differences between the different sub frames carried by the SCH whereby the sub frame identity, and hence the frame boundary, is identified by calculating the difference between the positions of the two subsequent slots/sub-frames or any data packets which may be identical to each other.

The present invention discloses a system for sub-frame ID and frame boundary detection in LTE, which system implements the use of the differences between the different sub frames carried by the SCH whereby the sub frame identity, and hence the frame boundary, is identified by calculating the difference between the positions of the two subsequent slots/sub-frames or any data packets which may be identical to each other.

BRIEF DESCRIPTION OF ACCOMPANYING DRAWINGS

The foregoing and other objects, features, and advantages of the present invention will become more apparent from the ensuing detailed description of the invention, taken in conjunction with the accompanying drawings, in which.

DETAILED DESCRIPTION OF THE PREFERRED EMBODIMENTS

The preferred embodiments of the present invention will now be explained with reference to the accompanying drawings. However, it should be understood that the disclosed embodiments are merely preferred, and may be embodied in various forms. Therefore, the details disclosed herein are not to be interpreted as limiting but merely as the basis for the claims and as a basis for teaching one skilled in the art how to make or use the invention. A detailed description of known functions and configurations incorporated herein has been omitted herein for the sake of clarity and conciseness.

The LTE cell search procedure requires synchronization both in time and frequency and should be able to detect the frame boundary (or alternatively the sub-frame ID), so that the subsequent information in the downlink may be properly discerned. The synchronization procedure is completed with the help of SCH, which is carried in one or more sub-frames in an LTE system.

A small number of SCH symbols per radio frame are desirable in order to reduce the overhead. Furthermore, from the aspect of the timing detection performance against noise and interference, the signal energy of the SCH should be concentrated on a small number of Orthogonal Frequency Division Multiplexing (OFDM) symbols. However, time diversity employing multiple SCH symbols is very effective in achieving fast cell search by improving the detection probability of the SCH, particularly in a high mobility environment. Multiple SCH symbols per radio frame can also reduce the minimum required correlation detection period for SCH timing detection.

Figure 1:
FIG. 1 illustrates SCH symbols equally spaced, in which figure it is not possible to identify which sub-frame is received when all the SCH symbols are identical.

Therefore, one or more SCH symbols (typically two or four SCH symbols) mapping in a 10-millisecond radio frame is a utilized structure as shown in FIG. 1. So, more than 1 SCH symbol in one radio frame is required. These symbols will be located in different sub frames.

The above requirement imposes the necessity to know the sub frame ID in order to know the frame boundary. To explain, the UE receives an SCH sequence and needs to know which sub frame is being transmitted currently. For example, if the SCH is transmitted in sub frame 1, 6, 11 and 16 in FIG. 1, the UE needs to know the sub frame to which the received SCH belongs. Only then may the UE determine the current frame position and the frame boundary.

The present invention discloses the following method to receive the frame boundary:

The sub frame ID is explicitly signaled, for example using data bits in the SCH symbol which is not carrying the Primary SCH (hereinafter P-SCH).

When SCH symbols transmitted on different sub frames are not identical, the UE will come to know of the sub frame ID by using the corresponding (i.e., pre-stored) mapping between the received SCH and the sub frame ID.

When above signaling (i.e., point 1) is not possible, such as when data insertion in SCH symbols may not be a viable option and may disturb any property such as time-domain symmetry of the P-SCH, and more than one SCH transmitted are identical, the present invention discloses the sub frame position difference method.

In the sub frame position difference method, Frame Timing will be given by repeatability of SCH in a Frame, or the number of times SCHs occur in a frame.

In a Case 1, in which there is One SCH per Frame, only one SCH will directly indicate the position in the frame.

In a Case 2, in which there are Two SCHs per Frame, the frame boundary can be identified by repeating the SCH in any position except that in which the distance between them (hereinafter position difference) is 20/2=10. Specifically, the first and the second SCH may not be positioned in 1st and 11th place. Any other position difference, from 1-9, is valid.

In a Case 3, in which there are three SCHs per Frame, the position difference pattern will define the Frame boundary. Specifically, the position difference between any two subsequent SCHs will not be a constant. For example, the position differences can be arithmetically progressing.

Let the position difference pattern be 1, 3, 6, i.e. the sub frame containing SCH are expected to be at one of these three out of 20 available sub frames. When an SCH sub frame is received, we wait for the next SCH sub frame and if the difference between these two sub-frames is 2, then the first and the second SCH sub frame is received respectively. If the difference between these two sub-frames is 3, then the second and third SCH sub frames are received respectively. When the difference is greater than 3, the third SCH sub frame and the first sub-frame of the next frame are received respectively. Here, the constant position difference pattern cannot be used. The position difference pattern will be known in advance and will be unique.

The foregoing theory can be extended to n repeat SCHs in a Frame.

For example, in FIG. 1 if the UE received an SCH sub-frame and received another SCH sub-frame after 5 sub-frames; it does not indicate anything about the sub-frames position (i.e., sub-frame ID).

Figure 2:
FIG. 2 illustrates four SCH symbols placed in frames 1 4 10 17 with a position difference of (3, 6, 7, 4) between the subsequent. SCH sub-frame, in which the sub-frame ID, and thus the Frame boundary, can be precisely identified from the SCH carrying sub-frame position difference between two such sub-frames.

However, from FIG. 2 in which four SCH symbols are placed in frames 1, 4, 10 and 17, it can be identified which SCH sub-frame was received prior to the current SCH sub-frame based on the number sub-frames received between them. For example, if the sub-frame difference between two SCH sub-frames is 7, then the two SCH sub-frames are at positions 10 and 17, respectively.

To illustrate further the following combinations are valid:
1, 4, 8, 13—ok (3, 4, 5, 8)
1, 4, 8, 14—ok (3, 4, 6, 7)
1, 4, 8, 15—ok (3, 4, 7, 6)
1, 4, 8, 16—ok (3, 4, 8, 5)
1, 4, 9, 17—ok (3, 5, 8, 4)
1, 4, 10, 17—ok (3, 6, 7, 4)

Conversely, the following combinations are NOT valid:
1, 4, 9, 15—Not possible (3, 5, 6, 6)
1, 4, 9, 16—Not possible (3, 5, 7, 5)
1, 5, 10, 16—not possible (4, 5, 6, 5)
1, 5 10 17—not possible (4, 5, 7, 4)
1, 6, 11, 17—not possible all equally spaced (5)
1, 6, 12, 16—not possible (5, 6, 4, 5)

The foregoing combinations are only a few of the valid/not valid combinations. Also, to increase the probability of detection the SCH sub-frames should be as equally spaced from each other as possible. Although many combinations of SCH sub-frame position are possible, the one that retains the above-described property as much as possible, e.g., 1, 4, 8, 15, should be primarily considered.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

What is claimed is:

1. A method for sub-frame IDentification (ID) and frame boundary detection in Long Term Evolution (LTE), comprising:
implementing differences between a plurality of sub frames carried by a Synchronization CHannel (SCH); and
identifying, by a User Equipment (UE), a sub frame identity and the frame boundary by calculating a difference between respective positions of two subsequent slots and sub-frames or any identical data packets,
wherein, for every particular pair of consecutive SCH symbols within a frame, the difference between the positions of the particular pair of consecutive SCH symbols is less than a difference between positions of any consecutive SCH symbols following the particular pair within the same frame.

2. A method as claimed in claim 1, wherein the sub frame ID is explicitly signaled or is performed using data bits in an SCH symbol that is not carrying a Primary SCH (P-SCH).

3. A method as claimed in claim 1, wherein, when SCH symbols transmitted on different sub frames are not identical, the UE identifies the sub frame ID by using corresponding mapping between a received SCH and the sub frame ID.

4. A system for sub-frame IDentification (ID) and frame boundary detection in Long Term Evolution (LTE), comprising:
means for implementing differences between a plurality of sub frames carried by a Synchronization CHannel (SCH), and
means for identifying a sub frame identity and the frame boundary by calculating a difference between respective positions of the two subsequent slots and sub-frames or any identical data packets,
for every particular pair of consecutive SCH symbols within a frame, the difference between the positions of the particular pair of consecutive SCH symbols is less than a difference between positions of any consecutive SCH symbols following the particular pair within the same frame.

5. A method for sub-frame identification, comprising:
calculating, by a User Equipment (UE), for pairs of consecutively received Synchronization CHannel (SCH) symbols, a difference between positions of the pairs of consecutively received SCH symbols; and
determining, by the UE, a sub-frame IDentity (ID) of a received SCH symbol according to the calculated differences,
wherein, for every particular pair of consecutive SCH symbols within a frame, the difference between the positions of the particular pair of consecutive SCH symbols is less than a difference between positions of any consecutive SCH symbols following the particular pair within the same frame.

6. The method of claim 5, wherein the sub frame ID is explicitly signaled by data bits included in an SCH symbol that is not carrying a Primary SCH (P-SCH).

7. The method of claim 5, wherein at least two of the received SCH symbols are identical.

8. The method of claim 7, wherein, when at least two consecutively received SCH symbols are not identical, a sub frame ID of at least one of the non-identical SCH symbols is determined according to a mapping between the non-identical SCH symbol and the sub frame ID of the non-identical SCH symbol.

9. The method of claim 5, wherein the method is performed in a Long Term Evolution (LTE) communication system.

10. The method of claim 5, further comprising determining a frame boundary according to the calculated differences.

11. A system for sub-frame IDentification (ID) and frame boundary detection, comprising:
means for calculating, for pairs of consecutively received Synchronization CHannel (SCH) symbols, a difference between positions of the pairs of consecutively received SCH symbols; and
means for determining a sub-frame IDentity (ID) of a received SCH symbol according to the calculated differences,
wherein, for every particular pair of consecutive SCH symbols within a frame, the difference between the positions of the particular pair of consecutive SCH symbols is less than a difference between positions of any consecutive SCH symbols following the particular pair within the same frame.

12. The system of claim 11, wherein the sub frame ID is explicitly signaled by data bits included in an SCH symbol that is not carrying a Primary SCH (P-SCH).

13. The system of claim 11, wherein at least two of the received SCH symbols are identical.

14. The system of claim 13, wherein, when at least two consecutively received SCH symbols are not identical, a sub frame ID of at least one of the non-identical SCH symbols is determined according to a mapping between the non-identical SCH symbol and the sub frame ID of the non-identical SCH symbol.

15. The system of claim 11, wherein the method is performed in a Long Term Evolution (LTE) communication system.

16. The system of claim 11, wherein a frame boundary is determined according to the calculated differences.

17. A method for transmitting a frame, comprising determining, by a base station, a difference between positions of Synchronization CHannel (SCH) symbols in a frame; and transmitting, by the base station, the frame including subframes of the SCH symbols according to the determined difference, wherein, for every particular pair of consecutive SCH symbols within the frame, the difference between the positions of the particular pair of consecutive SCH symbols is less than a difference between positions of any consecutive SCH symbols following the particular pair within the same frame.

18. The method of claim 17, wherein a sub frame IDentity (ID) is explicitly signaled by data bits included in an SCH symbol that is not carrying a Primary SCH (P-SCH).

19. The method of claim 17, wherein the method is performed in a Long Term Evolution (LTE) communication system.

* * * * *